United States Patent Office 3,577,502
Patented May 4, 1971

3,577,502
PROCESS FOR ANNEALING SUBSTANTIALLY UNSTRETCHED POLYLACTONE ARTICLES
Jan Selman and Hendricus A. Oosterhof, Amsterdam, Netherlands, assignors to Shell Oil Company, New York, N.Y.
No Drawing. Filed Feb. 9, 1968, Ser. No. 704,269
Claims priority, application Great Britain, Feb. 24, 1967, 8,861/67
Int. Cl. B29c 25/00; C08g 17/02; D01f 1/02
U.S. Cl. 264—235
10 Claims

ABSTRACT OF THE DISCLOSURE

The extensibility, impact properties, hardness, softening temperature, water absorption and solvent resistance of shaped articles of substantially unstretched polylactones (polypivalolactone) are significantly improved by thermal after-treatment, i.e., by annealing without deformation at a temperature between about 140° and 230° C.

BACKGROUND OF THE INVENTION

This invention relates to a method for the manufacture of articles of substantially unstretched polypivalolactone having improved physical properties and to the improved articles thus obtained.

British Pat. No. 1,055,740 discloses the preparation of articles such as threads, fibers, tapes, and films comprising polypivalolactone. Usually, such fibers, tapes, and films will be "cold" stretched, thereby imparting a higher degree of orientation to the polymer molecules, so as to improve the tensile properties. While such "cold" stretching does improve the tensile properties, there is still a need to improve these properties even further. Also, there are occasions when it is expensive or difficult to "cold" stretch the formed article for a multitude of reasons.

The present invention is directed to a method for improving the tensile properties of articles of polypivalolactone wherein the "cold" stretching techniques are obviated, i.e., the polypivalolactone articles are substantially in the unstretched condition. Such articles may be obtained from polypivalolactone sheets, rods, nibs, granules, powder, flakes and the like, by forming operations such as molding and extrusion. As used in this specification, the expression "substantially unstretched" indicates that subsequent to the forming operation the articles have not been subjected to a stretching operation or, more specifically, to a stretching operation whereby any dimension of the articles is increased by more than 10%. As a matter of fact, "stretched" polypivalolactone can only be obtained by physically stretching a preformed article made of polypivalolactone. As used herein, "stretching" excludes compressive deformation.

SUMMARY OF THE INVENTION

It has now been unexpectedly found that the properties of articles of substantially unstretched polylactones, expecially polypivalolactone, may be substantially improved by a thermal after-treatment. Particularly, the extensibility and impact properties, as well as the hardness, softening temperature, water absorption and solvent resistance can be significantly improved by this thermal after-treatment (annealing). It has, moreover, been found that such improvement is more pronounced if the polypivalolactone contains a nucleating agent.

DESCRIPTION OF THE PREFERRED EMBODIMENT

According to the instant invention, a method is provided for the manufacture of improved molded or extruded articles of polypivalolactone in which a molded or extruded article of substantially unstretched polypivalolactone containing a nucleating agent having a particle size of not more than 5 microns (i.e., when worked into and as present in the pivalolactone) is annealed without deformation other than shrink at a temperature of between 140° and 230° C., preferably between 160° and 200° C.

Particularly preferred polylactones are the polymers obtained by polymerizing beta-lactones, particularly the alpha,alpha-dialkyl-beta-propio-lactones wherein the alkyl groups contain from 1 to 4 carbon atoms, including those compounds in which the two alkyl groups and the alpha-carbon atom of the lactone ring are combined to form one cyclic structure, such as, for example, 2-oxa-4-spiro[3.6]decanone-1. Suitable examples include alpha,alpha-di methyl-beta-propiolactone, alpha-methyl-alpha-ethyl-beta-propiolactone, alpha-methyl-alpha-isopropyl-beta-propiolactone, alpha-ethyl-alpha-tert-butyl-propiolactone, alpha, alpha-diisopropyl-propiolactone, etc. The most preferred alpha,alpha-dialkyl-beta - propiolactone is alpha,alpha-di-methyl-beta-propiolactone (pivalolactone).

The poly (beta-lactone) may be prepared by any conventional means, usually in the pesence of a suitable catalysts (see U.S. No. 3,021,309, U.S. No. 3,268,486, British No. 766,347, French No. 1,231,163, or Belgian No. 649,828).

Suitable catalysts which may be used in polymerizing the beta-lactones include the primary, secondary, or tertiary amines such as trimethylamine, triethylamine, tri (beta-hydroxyethyl)amine, tripropylamine, triisopropylamine, methyldiethylamine, tri-n-butylamine, diethyl-n-butylamine, dimethylhexylamine, triphenylamine, diethylamine, di-n-propylamine, diisopropylamine, dibutylamine, monobutylamine, monophenylamine, triethylenediamine, hexamethylenetetraamine, and the like. Other catalysts include quaternary ammonium compounds and especially the tetraalkylammonium halides or hydroxides where the alkyl groups contain from 1 to about 4 carbon atoms such as tetraethylammonium bromide, tetrapropylammonium bromide, ethyltriisopropylammonium chloride, tetraethylammonium hydroxide, etc. These catalysts are disclosed in copending U.S. application Ser. No. 388,662, filed Aug. 10, 1964, now U.S. Pat. No. 3,268,487.

Another group of very suitable polymerization catalysts are the arsines, stibines and phosphines as well as the addition products thereof. Suitable catalysts of this type are those disclosed in copending U.S. application Ser. No. 363,992, now U.S. Pat. No. 3,268,486, filed Apr. 30, 1964, the description thereof which is incorporated herein by reference. Especially preferred catalysts of this type are the tertiary phosphines and the quaternary phosphonium compounds such as trimethylphosphine, triethylphosphine, tri(beta - chloroethyl)phosphine, triphopylphosphine, triisopropylphosphine, tri-n-butylphosphine, triisobutylphosphine, dimethylhexylphosphine, diethyl-n-pentylphosphine, and diisopropyl-n-butylphosphine, triphenylphosphine, tribenzylphosphine and tritolylphosphine tetrabutylphosphonium bromide, triphenylbutylphosphonium bromide, tetraethylphosphonium hydroxide and ethyltriisopropylphosphonium bromide.

The preferred polylactone is polypivalolactone. By the term "polypivalolactone" is meant a thermoplastic resin which substantially consists of a linear polyester having recurring ester structural units of the formula

—O—CH$_2$—C(CH$_3$)$_2$—C(O)—

The polyester may readily be prepared by the polymerization of pivalolactone (alpha,alpha-dimethyl-beta-propiolactone) as disclosed by Klootwijk in U.S. 3,268,486. The thermoplastic resin may consist of a polymer obtained from pivalolactone as the sole monomer or may consist of certain copolymers or polymer blends. Thus, copolymeric components may be present in the polyester in amounts of up to 25 mol. percent. It is preferred that the copolymeric units be grouped in blocks alternating with blocks of pivalolactone polymer. As copolymer components, lactones are particularly suited, especially beta-propiolactones. For example, the copolymers may be derived from copolymerization of pivalolactone with up to 25 mol. percent of alpha,alpha-diethyl-beta-propiolactone or alpha - ethyl-alpha-methyl-beta-propiolactone. Also suitable in the invention are blends of a pivalolactone polymer or copolymer as defined hereinbefore with up to about 25% by weight of other thermoplastic resins such as polyamides like nylon-6 or nylon-12; polyesters like polyethyleneterephthalate; polyvinyl chloride; polyvinyl butyral; polyepoxides (+ curing agent); polyolefins like polypropylene and chlorinated polyether resins like "Penton."

Of course, pigments, stabilizers, fillers, nucleating agents and other additives may be present in the polypivalolactone particles. In particular, it is desirable that one or more heat stabilizers and nucleating agents to be present in the particles. Suitable heat stabilizers include, among others, thiuram sulfides, dithiocarbamates and xanthogenates, such as copper (II), dimethyldithiocarbamate and tetramethylthiuram disulfide; copper salts of carboxylic acids having a tertiary or quaternary α-carbon atom, such as the copper (II) salt of "Versatic" 1519 (a commercially available carboxylic acid obtained by subjecting a mixture of C$_{14}$–C$_{18}$ alpha-olefins to the Koch reaction); nitroso aromatic compounds, such as 2,4-dinitrosoresorcinol; and phosphites like tris-(nonylphenyl)-phosphite and pentaerythritolphosphite. Very good results are obtained when phosphites are used in combination with one or more other heat stabilizers, such as the preferred combination of tetramethylthiuramdisulfide and tris(nonylphenyl)-phosphite. These stabilizers are generally used in amounts of 0.1–5% by weight, preferably 0.2–2% by weight based on polypivalolactone. Adequate stabilization may thus be obtained by means of, e.g., 0.1% by weight of tetramethylthiuram disulfide and 0.4% by weight of tris-(nonylphenyl)-phosphite.

Other additives which may be incorporated in the polypivalolactone particles are light stabilizers such as benzophenones, e.g., 2-hydroxy-4-n-octoxy-benzophenone, and benzotriazoles, e.g., 2-(2-hydroxyphenyl)-benzotriazole. These stabilizers may be used in amounts up to 2% by weight, preferably 0.1–1% by weight, based on polypivalolactone.

Suitable fillers which may be employed as desired, include, among many others, aluminum powder, mica, bentonites, clays, synthetic resins and elastomers, ignited Al$_2$O$_3$, short-fiber asbestos, wood flours, barytes, carbon black, silica, zinc dust, talc and the like. A large number of fillers are available commercially in particle sizes from about 0.1 micron upward. Other suitable fillers include the pigments which are chemically-stable inorganic or organic pigments such as titania, phthalocyanine blue or green, iron oxide and cadmium red.

The quantity of fillers used is dependent upon many factors such as cost, particle size, particle shape, absorption characteristics and loading volume.

It is advantageous that the polypivalolactone used in the molding or extrusion of the articles possesses a relatively high molecular weight, i.e., the limiting viscosity number (LVN) will, in general, be above 0.75 dl/g. (measured in benzyl alcohol at 135° C.), preferably above 2.0 dl./g. The LVN is given by the formula:

$$LVN = \lim_{c \to 0} \left(\frac{\eta_{sp}}{c}\right)$$

in which $\eta_{sp}$ stands for the specific viscosity and c for the concentration of the polypivalolactone in benzyl alcohol in grams per 100 milliliters.

It is generally known that the smaller the particle size of the nucleating agent used, the better the nucleation of a polymer will be. The nucleating agents used in accord-particle size of not more than 5, preferably not more than 2% w. (based on polypivalolactone) have, in general, a particle size of not more than 5, preferably not more than 1 micron. Very good results have been obtained with nucleating agents having a particle size of less than 30 millimicrons.

If higher concentrations of nucleating agents are used, their particle size may be greater, the value of d/c being not more than 5, preferably not more than 1 micron, in which d indicates the average largest dimension of the particle in microns and c the concentration of the nucleating agent in weight percent, based on polypivalolactone. It is advantageous to employ nucleating agents which have needle-like crystals.

In general, such nucleating agents may be used which have a melting point above 200° C., preferably above that of the polypivalolactone, which is in the range of 240–250° C. As a matter of fact, the nucleating agent used will have a melting point above the annealing temperature employed. Suitable nucleating agents are, inter alia. fine metal powders, such as aluminum, lead and electrolytic copper powder; inorganic substances, such as graphite, carbon black, glass fibers, asbestos, magnesia, silica, zinc oxide, titanium dioxide, barium sulfate, calcium or sodium carbonate, molybdenum disulfide, cobalt monosulfide, iron (II) sulfide, tungsten disulfide, calcium tungstate, alkali halides such as sodium chloride and lithium fluoride, talc, clay; coronene; pigments, such as flavanthrene, metal salts of sulfonated azo pigments and quinacridone.

Preferred nucleating agents are:

(a) salts with the general formula MX, where X represents a halogen with an atomic number of at least 17 or nitrogen, and M represents an alkali metal or boron;

(b) salts of mono-, bi- and trivalent metals and organic acids which contain an acidic hydroxyl group attached to an aromatic carbon atom by means of a group having the structure

where Y represents a carbon sulfur or phosphorus atom;
(c) silica.

The compounds belonging to the above category (a) are boron nitride and the chlorides, bromides, and iodides of alkali metals, among which the sodium and potassium chlorides are particularly effective. In this category, boron nitride appears to have the strongest nucleating action and is therefore preferred.

As stated hereinbefore, the compounds of category (b) comprise salts of organic acids containing a group

which on one side is attached to an acidic hydroxyl group and on the other to an aromatic carbon atom. For the sake of simplicity, the Y atom in the above formula has been drawn as being tetravalent only, with a possible fifth or sixth valence bond having been omitted. This should, however, by no means be considered restrictive. In the case of the symbol Y representing a sulfur atom, this atom may be both tetravalent and hexavalent. In the case of Y being a phosphorus atom, pentavalent phosphorus is meant. As a result, the said group of organic acids comprises: carboxylic acids, sulfonic acids, sulfinic acids, phosphonic acids and phosphinic acids, in which the acidic hydroxyl group therefore forms part of the respective structures

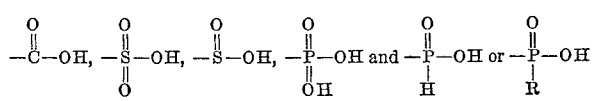

where the group R may be a hydrocarbon radical, for example an alkyl or aryl group.

Particularly preferred compounds of category (b) are the salts of carboxylic acids, sulfonic acids, and phosphinic acids containing the group indicated above, with a hydrogen atom directly attached to phosphorus.

Salts of acids containing a carboxyl group attached to an aromatic ring such as a naphthalene or a benzene ring have very attractive nucleating action. More specifically, the salts of benzenecarboxylic acids which carry as a substituent a tertiary alkyl group or a carboxyl group which may or may not be esterified have proved excellent nucleating agents. Examples of such active salts are salts of p-tert-butylbenzoic acid, phthalic acid, tetrachlorophthalic acid and salts of the monoalkyl esters of phthalic acid and tetrachlorophthalic acid.

Also preferred are the salts derived from naphthalenesulfonic acids such as the salts of naphthalene-1-sulfonic acid and naphthalene-2-sulfonic acid.

The mono-, bi- or trivalent metals in the aforementioned salts of organic acids are preferably the alkali metals and alkaline earth metals, among which special preference is given to potassium, sodium, and barium. It is further noted that the above discussion of the metal salts or organic acids exclusively refers to the neutral salts.

The quantities in which the nucleating agents are present in the compositions according to the invention usually range from 0.0001 to 5 percent by weight or more, calculated on weight of polypivalolactone. Quantities of from 0.01 to 2 percent by weight are preferred.

The nucleating agent may be incorporated into the polypivalolactone by adding it to the pivalolactone to be polymerized. It is also possible, however, to add the nucleating agent to the polymeric material, i.e., to the polypivalolactone powder, granules, nibs and the like, either before or during the forming operation. Preferably, the nucleating agent is dry-mixed with polypivalolactone powder, e.g., in a Banbury mixer whereafter, if desired, the mixed powder may be extruded into nibs or pellets.

Forming of the articles from the polypivalolactone containing the nucleating agent may be effected in any manner known for this purpose, provided the article is not being "cold" stretched, i.e., stretched at temperatures below about 230° C. Thus articles may be made by compression or injecting molding or by extrusion. One method of compression molding consists, for example, in "cold" forming or forgeing polypivalolactone (powder, pellets, sheet, and the like) in a press at temperatures of 0–235° C. If desired, the molded or extruded articles may be machined prior to annealing, e.g., by cutting, drilling, sawing, or grinding.

Annealing of the article is effected without deformation other than shrink, either by heat-treating the article in an annealing oven or bath or by keeping the molded article for a fraction of a minute to several hours in the mold at a temperature of between 140 and 230° C. If desired, the articles may be subjected to alternate cooling and annealing cycles. It has been found that very good properties of the polypivalolactone may be obtained if the annealing treatment is carried out under such conditions that (unfilled) pivalolactone homopolymer reaches a density of at least 1.175 g./ml., preferably of at least 1.19 g./ml. It will depend on the annealing temperature how long the operation will have to be continued before the desired density is reached. In general, the annealing will take from a fraction of a minute to 12 hours or more, preferably from 0.5–30 minutes. The higher the temperature, the shorter the annealing time can be.

Usually, the optimum combination of the annealing time and temperature is determined experimentally for a particular type of article, which will depend, inter alia, on the article's thickness and geometry. Minimum annealing temperatures have been found to be 15 seconds at 230° C., 1 minute at 180° C., 30 minutes at 160° C. and 3 hours at 140° C.

Depending on the annealing medium used, different heating units are used. When using liquid baths, such baths usually consist of tanks or troughs filled with water, oils or waxes. When using a gaseous heating medium, gas-flow ovens have proved to be suitable. A non-oxidizing medium such as steam, nitrogen or carbon dioxide may be used as well as air. Usually, in one compartment of the oven, the gas is heated to the required temperature, then flows to another compartment in which the article is annealed. After annealing, a proper method for slow and gradual cooling is suitably provided, preferably at a cooling rate of less than 15° C./minute.

Good results have also been obtained if a liquid annealing medium is used, such as a high-boiling hydrocarbon oil, fat or wax; synthetic oils such as fluorocarbons, silicone oils, glycol ethers and esters, and the like. Suitably, such oils have a boiling point of at least 250° C. as well as adequate stability.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLES 1–12

Sheets of 90 x 50 x 1 mm. were compression molded at 270° C. with a 5 minute pressing time from polypivalolactone polymers A and B having a limiting viscosity number of 2.8 and 2.3 dl/g., respectively, measured in benzyl alcohol at 135° C. All the sheets were quenched in water while some received various after-heat treatments. Annealing was carried out in an air oven. The polymers contained 0.1 phr. (parts per one hundred parts of polypivalolactone on a weight basis) of the sodium salt of alpha-naphthalene sulfonic acid as nucleating agent and 0.05 phr. of tetramethylthiuram disulfide and 0.2 phr. of tris-(nonylphenyl)-phosphite as stabilizers. For comparative purposes, sheets were also pressed from polymers containing no nucleating agent. By manually bending strips cut from the sheets through an angle of 90°, the bending resistance was determined. On dumb-bells cut from the sheets, tensile measurements were carried out. In Examples 11 and 12 dumb-bells were used which had been prepared by injection molding at 270° with a mold temperature of 75° C. and a cycle time of 5–10 seconds. Tensile impact strengths were determined according to ASTM–D–1822. The results are tabulated in Table I wherein it is apparent that polypivalolactone containing a nucleating agent exhibits better tensile properties than the polypivalolactone containing no nucleating agent.

TABLE I

| Experiment | Polymer | Sheet-after-treatment | Density, gram/milliliter | Bending resistance | Tensile strength, kg./cm.² | Elongation at break, percent | Tensile impact strength, kg.mc/cm.² |
|---|---|---|---|---|---|---|---|
| 1 | B/U | None | 1.170 | br | 342 | 6.1 | |
| 2 | B/U | 60'/225° [1] | 1.202 | c.b.b. | 365 | 5.5 | |
| 3 | B²/N | None | 1.172 | br | 327 | 6 | 5 |
| 4 | B²/N | 1'/230° | 1.198 | c.b.b. | 367 | 16 | 23 |
| 5 | A/N | None | 1.172 | br | 377 | 3 | |
| 6 | A/N | 15'/125° | 1.184 | br | 386 | 7.5 | |
| 7 | A/N | 5'/180° | 1.192 | c.b.b. | 395 | 19.4 | |
| 8 | A/N | 60'/200° | 1.190 | c.b.b. | 402 | 45.8 | |
| 9 | A/N | 30'/225° | 1.194 | c.b.b. | 387 | 31.5 | |
| 10 | B²/N | 90'/225° | 1.198 | c.b.b. | 370 | 24 | 110 |
| 11 | B²/N | None | 1.176 | c.b.b. | 410 | 13.5 | 150 |
| 12 | B²/N | 1'/225° | 1.201 | c.b.b. | 380 | 125 | 500 |

[1] Sheet annealed at 225° C. for 60 minutes.
[2] Kneading the polymer during incorporation of the nucleating agent, decreased the LVN to 1.70.

NOTE:
N = nucleated.
U = unnucleated.
br = strip broke on bending.
c.b.b. = did not break on bending.

EXAMPLE 13

The procedures of Examples 1–12 were substantially repeated wherein 0.1 phr. of the following nucleating agents were used in lieu of the sodium salt of alpha-naphthalene sulfonic acid: sodium chloride, potassium chloride, boron nitride and silica. Related results were obtained.

We claim as our invention:

1. In a method for the manufacture of shaped polylactone articles having improved physical properties wherein the polylactone is shaped, the improvement which comprises annealing without deformation at a temperature between 140° and 230° C. the said shaped articles comprising a substantially unstretched poly(beta-lactone) and from 0.0001 to 5% by weight of a nucleating agent having a particle size of not more than 5 microns, wherein the term substantially unstretched means that said shaped articles have not been subjected to a stretching operation whereby any dimension is increased by more than 10%.

2. A method as in claim 1 wherein the annealing temperature is between 160° and 200° C.

3. A method as in claim 1 wherein the nucleating agent has the general formula MX, wherein X represents a halogen having an atomic number of a least 17 or nitrogen and M represents an alkali metal or boron.

4. A method as in claim 3 wherein the nucleating agent is sodium or potassium chloride.

5. A method as in claim 3 wherein the nucleating agent is boron nitride.

6. A method as in claim 1 wherein the nucleating agent is a salt of a mono-, bi- or trivalent metal and an organic acid containing an acidic hydroxyl group attached to an aromatic carbon atom by means of a group with the structure

wherein Y represents a carbon, sulfur, or phosphorus atom.

7. A method as in claim 1 wherein the nucleating agent is silica.

8. A method as in claim 1 wherein the poly(beta-lactone) is a poly(alpha, alpha-dialkyl-beta-propiolactone) wherein the alkyl group contain 1 to 4 carbon atoms.

9. A method as in claim 8 wherein the poly(beta-lactone) is polypivalolactone.

10. A method as in claim 1 wherein the nucleating agent is utilized in an amount from 0.01 to 2 percent by weight of the poly(beta-lactone).

References Cited

UNITED STATES PATENTS

| | | | |
|---|---|---|---|
| 3,227,664 | 1/1966 | Blades et al. | 264—41 |
| 3,299,171 | 1/1967 | Knobloch et al. | 260—78.3 |
| 3,424,835 | 1/1969 | Armour et al. | 264—210 |
| 3,471,455 | 10/1969 | Binsbergen | 260—78.3 |

FOREIGN PATENTS

| | | | |
|---|---|---|---|
| 960,608 | 6/1964 | Great Britain | 264—211 |
| 1,098,965 | 1/1968 | Great Britain | 260—78.3 |

ROBERT F. WHITE, Primary Examiner

J. R. THURLOW, Assistant Examiner

U.S. Cl. X.R.

260—2.5, 78.3; 264—211, 331, 346